United States Patent Office 3,560,495
Patented Feb. 2, 1971

3,560,495
1-HETEROCYCLIC AMINO METHYL OR 1-HETER-
OCYCLIC HYDRAZINO METHYL-3-PHTHALIM-
IDO OR (3',6' - DITHIA - 3',4',5',6' - TETRAHYDRO-
PHTHALIMIDO) - PYRROLIDINEDIONES - 2,5 OR
PIPERIDINEDIONES-2,6
Ernst Frankus, Dorfstrasse 14, Schleckheim, near Aachen,
Germany; Heinrich Mueckter, Eupener Str. 291,
Aachen, Germany; and Siegfried Herrling, Auf der
Liester 8; Franz Otto, Galmeistrasse 57; and Horst
Boehlke, Trockener Weiher 33, all of Stolberg, Rhine-
land, Germany
No Drawing. Filed May 9, 1966, Ser. No. 548,400
Claims priority, application Austria, Oct. 15, 1965,
A 9,341/65; Germany, May 8, 1965, P 15 45 672.1;
Oct. 13, 1965, P 15 45 707.5
Int. Cl. C07d 87/46
U.S. Cl. 260—247.1                                   7 Claims

ABSTRACT OF THE DISCLOSURE

Dicarboxylic acid imides which are substituted by an acylated amino or imino group and at the imido group by basically substituted methyl have valuable pharmacological properties, such as antitumor, immuno-suppressive, blood pressure lowering, and sedative properties. Examples of such compounds are 3-phthalimido piperidinediones-2,6 substituted in 1-position by a morpholino, piperidino, or pyrrolidino methyl group or by an N-methyl-N-morpholino or N-methyl-N-piperidino amino methyl group; 3 - (3',5'-dithia-3',4',5',6'-tetrahydrophthalimido) piperidinedione-2,6 substituted in 1-position by a morpholino, piperidino, or pyrrolidino methyl group; 3-phthalimido pyrrolidinedione-2,5 substituted in 1-position by a morpholino, piperidino, or pyrrolidino methyl group, and others.

The present invention relates to new and valuable dicarboxylic acid imides, and more particularly to dicarboxylic acid imides which have a dicarboxylic acid imido or a sulfo carboxylic acid imido group attached to one of the carbon atoms of the dicarboxylic acid imide and which carry a basic substituent at the imido nitrogen atom, to a process of making such compounds, and to a method of using them in therapy.

It is one object of the present invention to provide such new and valuable dicarboxylic acid imides.

Another object of the present invention is to provide a simple and effective method of producing such dicarboxylic acid imides.

A further object of the present invention is to provide a valuable and highly effective pharmaceutical composition containing such dicarboxylic acid imides.

Still another object of the present invention is to provide a method of using such dicarboxylic acid imides in therapy.

Other objects of the present invention and advantageous features thereof will become apparent as the description proceeds.

In principle the dicarboxylic acid imides according to the present invention correspond to the following Formula I

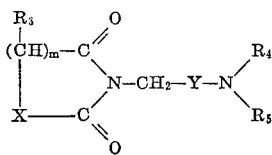

In said Formula I
X represents one of the groups

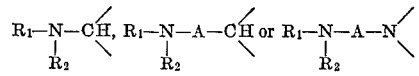

wherein $R_1$ indicates an organic carboxylic or sulfonic acid group or a urea or thiourea residue;
$R_2$ represents hydrogen or alkyl, aryl, aralkyl, cycloalkyl, or a heterocyclic ring which may be substituted, or the group

represents a five- or six-membered heterocyclic ring which may be connected with further ring systems or substituents and in which the nitrogen atom bearing the radicals $R_1$ and $R_2$ is the member of a

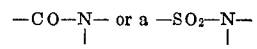

group, especially of a

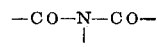

group and wherein
A represents a lower alkylene radical,
$R_3$ indicates a member of the group consisting of hydrogen, lower alkyl, aryl, and aralkyl,
$m$ represents one of the numerals 1, 2, or 3,
Y represents a single bond or the group

wherein $R_6$ indicates a lower alkyl, aryl, aralkyl or heterocyclic radical which may be substituted,
$R_4$ and $R_5$ indicate the same or different substituents and are lower alkyl, aralkyl, aryl, cycloalkyl, heteroalkyl, or a heterocyclic ring which may be substituted, or $R_4$ and $R_5$ together with the nitrogen atom to which they are attached form a five- or six-membered heterocyclic ring which may contain oxygen, sulfur, or nitrogen as a further hetero-atom and which may also be substituted.

In Formula I, X preferably represents the group

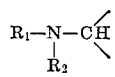

wherein

especially represents an aliphatic, cycloaliphatic, heterocyclic, or aromatic dicarboxylic acid imido group or an imido group of a dicarboxylic acid, the first carboxyl group of which is bound to an aromatic or heterocyclic ring system consisting of one or more rings and the second carboxyl group of which is bound to an aliphatic radical in neighboring position to the first carboxyl group, these dicarboxylic acid imido groups being attached to the cyclic imide by their imido nitrogen atom. Such dicarboxylic acid imides may be the imides of succinic acid, cyclopentane- or cyclohexane-1,3-dicarboxylic acid, fluorene-9,9-diacetic acid, naphthalene-1,2-, -2,3-, or -1,8-dicarboxylic acid, pyridine-2,3- or -3,4-dicarboxylic acid, imidazole or thiazole-4,5-dicarboxylic acid, benzimidazole-4,5- or -5,6-dicarboxylic acid, quinoline-2,3-, -3,4-, -4,5-, -5,6-, -6,7-, or -7,8-dicarboxylic acid, quinoxaline-2,3-dicarboxylic acid, thiopene- or furane-2,3- or -3,4-dicarboxylic acid, benzodioxane-2,3-dicarboxylic acid, 3,6-dithia-3,4,5,6-tetrahydrophthalic acid, 3,6-dithia-3,6-dihydrophthalic acid, 3,5 - dithiacyclopentane - 1,2 - dicarboxylic acid, o-sulfo benzoic acid, o-carboxymethylbenzoic acid, homophthalic acid, 2- or 4-carbomethylnicotinic acid as well as the imides of substituted dicarboxylic acids of this type and their hydrogenated or dehydrogenated derivatives.

$R_4$ and/or $R_5$ in said Formula I may be substituted, for instance, by alkyl and/or aryl, hydroxyl or mercapto groups which may be esterified or etherified, tertiary amino groups, carboxyl or carbalkoxy groups, or halogen. If $R_4$ and $R_5$ represent heterocyclic radicals, they may be, for instance, N-alkyl piperidyl-4 radicals. $R_4$ and $R_5$, together with the nitrogen atom to which they are attached, may form a heterocyclic ring, such as the pyrrolidine, piperidine, morpholine, thiomorpholine ring or a piperazine ring which may be substituted in 4-position for instance, the 4-methyl-, 4-benzyl-, 4-($\beta$-hydroxy ethyl)-, 4-acetyl piperazine ring and other similar substituted piperazine rings.

The compounds of the general Formula I contain at least one asymmetrically substituted carbon atom and, therefore, exist in isomeric forms. Within the scope of the present invention are not only the racemic forms of the compounds of Formula I or mixtures of their isomers, respectively, but also the pure isomers, for instance, the optically active forms of the compounds of Formula I, and the manufacture of these different forms of the compounds of Formula I.

The new cyclic imides according to the present invention exhibit highly valuable and noteworthy activities which permit their application in therapy. The new compounds have a marked antitumor activity as could be demonstrated by using the following test method.

If female Sprague-Dawley (SD) rats between 50 and 65 days old with a mean weight of 160 g. are given a single dose of 20 mg. of 7,12-dimethyl benzanthracene in 1 ml. of sesame oil through a stomach tube, there occur in the region of the milk ridge tumors the number of which is counted and the size or area of which is measured. Treatment of animals in which mammary tumors were induced in the described manner, with compounds of Formula I results in a noteworthy decrease of the number and size or area of the tumors in comparison to the tumor number and size or area in untreated control animals. The size or area of the tumor was calculated in sq. mm. as the product of the largest and the smallest diameter of the tumor palpable percutaneously. Starting with an average tumor size or area of 216.6 sq. mm. in 10 animals, the tumor size or area in untreated animals increases in four weeks to a size or area of 769 sq. mm. and the number of tumors is increased from 1.9 to 4.6 (mean value from 10 animals).

If the animals were given a feed containing 1.37% of 3-phthalimido-N-(morpholino methyl) glutaric acid imide, the compound of the following example 1, for four weeks, the tumor size or area decreases within said period of time from 237.6 sq. mm. to 134.1 sq. mm. and the tumor number decreases from 1.9 to 1.3. These values are mean values from 10 animals.

Similar results are obtained with other compounds according to the present invention. The following table illustrates the results obtained on a treatment of groups of 10 female Sprague-Dawley rats with each of the following compounds for four weeks in the amounts given.

TABLE

| Compound of example No. | Amount in feed, percent | Starting tumor | | Tumor after 4 weeks— | |
|---|---|---|---|---|---|
| | | Area, sq. mm. | Number | Area, sq. mm. | Number |
| Control | | 216.6 | 1.9 | 769 | 4.6 |
| 1 and 20 | 1.37 | 237.6 | 1.9 | 134 | 1.3 |
| 12 | 1.54 | 304.1 | 2.2 | 77.7 | 1.6 |
| 28 | 1.32 | 414.4 | 3.0 | 214.0 | 1.4 |
| 13 | 1.53 | 423.0 | 3.1 | 115.0 | 1.5 |
| 20 | 1.49 | 243.7 | 3.0 | 60.3 | 1.6 |
| 4 | 1.33 | 224.9 | 1.8 | 163.1 | 1.3 |
| 21 | 1.49 | 501.3 | 2.6 | 190.4 | 2.0 |
| 46 | 1.44 | 354.2 | 2.0 | 103.3 | 1.1 |
| 37 | 1.37 | 352.7 | 2.0 | 61.1 | 1.1 |

It is evident that administration of the compounds according to the present invention not only reduces the tumor area considerably but also decreases the number of tumors caused by administration of the carcinogenic agent.

Moreover the new compounds of the general Formula I show a favourable effect on survival of transplanted tissue, i.e., living particles of tissue transplanted from one organism to another. This effect was tested in Sprague-Dawley rats in which skin grafts were transplanted to animals of the same species. The animals were inspected whether or when, respectively, the grafts were rejected after transplantation. In untreated animals 12 days after the transplantation only 12% of the grafts were free of necroses. If, however, the animals had been fed for a period of five days before transplantation with a feed containing 1.36% of 1-morpholinomethyl-3-phthalimidopiperidinedione-2,6 racemic form) 42% of the grafts remained free of necroses on the 12th day after transplantation.

These immunosuppressive properties may be also an explanation for the fact that by the compounds of the general Formula I leprous diseases as well as damages caused by X-ray and autoimmune diseases may be influenced favourably.

Administration of compounds of the general Formula I influences on the endocrine system (endocrinopathies).

Moreover many of the compounds of Formula I could be shown to have a marked sedative effect.

Furthermore, the compounds of the general Formula I in which $m$ represents the number 1 or especially 2 are able to influence the blood pressure markedly and for a long duration. For instance, intraduodenal administration of 100 mg./kg. of 1-morpholinomethyl-3-phthalimido piperidinedione-2,6 to anesthetized cats resulted in a lowering of the blood pressure by 71% for more than 2 hours.

The new and valuable compounds of Formula I may be prepared by reacting a cyclic imide of Formula II.

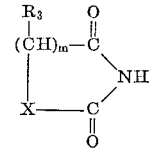

wherein X, $R_3$, and $m$ represent the same substituents and numerals as indicated herein above with a compound of Formula III

wherein $R_4$, $R_5$, and Y represent the same substituents as indicated above, or with an acid addition salt of a compound of Formula III, in the presence of formaldehyde. Preferably the formaldehyde is used in the form of its aqueous or alcoholic solution. In place of formaldehyde there may be used compounds which are capable of forming formaldehyde under the reaction conditions, for instance, paraformaldehyde or chloromethyl methyl ether. It is advisable to carry out the reaction in the presence of solvents or diluents. Preferably there are used organic solvents such as methanol, ethanol, β-ethoxy ethyl alcohol, dioxanes, or mixtures of water and organic solvents. The reaction is preferably carried out at elevated temperature, for instance, at a temperature between 50° C. and 80° C. However, it is also possible to work at room temperature or with cooling. There may be used stoichiometric amounts of the compounds of Formulas II and III and of formaldehyde. It is, however, also possible to use an excess of one or two of the three reactants.

The compounds of Formula I may be isolated by adding to the reaction mixture a liquid in which the reaction products are insoluble or at least poorly soluble. Thus in isolating compounds which are poorly soluble, for instance, in alcohol, from a mixture of water and alcohol, alcohol is added to said mixture to cause precipitation of the reaction product.

The compounds according to this invention may also be isolated by cooling the reaction mixture to cause crystallization of the reaction products. Preferably the reaction mixture is concentrated before cooling.

The solvent or diluent may also be removed by distillation and the resulting residue may then be recrystallized from suitable solvents or mixtures of solvents.

If desired, the resulting compounds of Formula I are converted into their acid addition salts by reaction with suitable acids if the compounds of Formula III have not beein used in the form of their salts.

The compounds of Formula I may also be prepared by reacting a compound of Formula IV

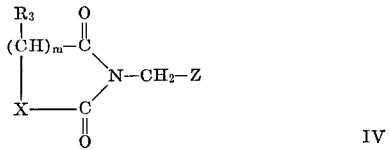

wherein X, $R_3$, and $m$ represent the same substituents and numerals as mentioned herein above and wherein Z represents hydroxyl, and esterified hydroxyl group, or halogen, with a compound of Formula III. This reaction may be carried out in the presence of an organic solvent and, if required, with azeotropical removal of the compound H—Z formed during the reaction.

Furthermore, the compounds of Formula I can be obtained by reacting a compound of Formula II with a compound of Formula V

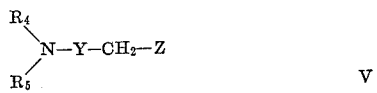

wherein $R_4$, $R_5$, Y and Z represent the same substituents as indicated herein above.

This reaction is also preferably carried out in the presence of an organic solvent and, if required, with azeotropical removal of the compound H—Z formed during the reaction.

The compounds of Formula I obtained in the manner described before may, if desired, be converted into their acid addition salts by reaction with inorganic or organic acids. Conversion into the salts, however, is not required since the reaction products as such can be used therapeutically.

In the manufacture of the compounds of Formula I in their optically active forms it is possible to proceed as described hereinbefore, but using the respective optically active starting materials. The compounds of Formula I may also be prepared in their raecemic form and may be resolved into their optically active forms in a manner known per se.

The starting materials of Formulas II, IV, and V are obtained in a manner known per se.

The following examples serve to further illustrate the present invention, limiting the same thereto. All melting points data are uncorrected.

EXAMPLE 1

80 g. of 3-phthalimido glutaric acid imide are suspended in 400 ml. of ethanol and heated to reflux temperature. 160 ml. of an aqueous 30% formaldehyde solution are added dropwise thereto followed by the addition of 64 ml. of morpholine. The reaction mixture is refluxed for one hour and is filtered, if necessary. The resulting clear solution is diluted with absolute ethanol until it starts to become turbid. On cooling 3-phthalimido-N-(morpholino methyl) glutaric acid imide is obtained in white crystals, M.P. 190–191° C. on recrystallization from dioxane/ether.

EXAMPLE 2

52 g. or 3-phthalimido pyrrolidinedione-2,5(3-phthalimido succinic acid imide) are suspended in 500 ml. of ethanol and refluxed. 52 ml. of a solution of formaldehyde (35% formaldehyde in water) are added dropwise thereto followed by the addition of 43 ml. of morpholine. The reaction mixture is refluxed for 15 minutes. After filtration, the filtrate is diluted with absolute ethanol until it becomes turbid. After cooling, 1-morpholine methyl-3-phthalimido pyrrolidinedione-2,5 (3-phthalimido-N-(morpholino methyl) succinic acid imide) is obtained in white crystals, M.P. 169–171° C. on recrystallization from dioxane/ether.

EXAMPLE 3

12 g. of 3-phthalimido pyrrolidinedione-2,5(3-phthalimido succinic acid imide) are suspended in 150 ml. of ethanol and refluxed. 25 ml. of an aqueous 35% formaldehyde solution are added thereto. The reaction mixture is refluxed until a clear solution is obtained. After cooling, 1-methylol-3-phthalimido pyrrolidinedione-2,5 (3-phthalimido-N-methylol succinic acid imide) is obtained in white crystals, M.P. 167–168° C. on recrystallization from dioxane/petroleum ether. 5.5 g. of said 1-methylol-3-phthalimido pyrrolidinedione-2,5 are dissolved in 50 ml. of ethanol. Two g. of morpholine are added thereto. The reaction mixture is refluxed for 15 minutes. After cooling, 1-morpholino methyl-3-phthalimido pyrrolidinedione-2,5 (3-phthalimido-N-(morpholino methyl) succinic acid imide) is obtained in white crystals, M.P. 169–171° C. on recrystallization from dioxane/ether.

EXAMPLE 4

12 g. of 3-phthalimido pyrrolidinedione-2,5 (3-phthalimido succinic acid imide) are suspended in 300 ml. of ethanol and refluxed. 5.2 ml. of an aqueous 35% formaldehyde solution are added dropwise thereto, followed by the addition of 4.3 ml. of piperidine. The reaction mixture is refluxed for one hour. The solvent is distilled off under reduced pressure. The residue is dissoved in absolute ethanol. On adding petroleum ether, 1-piperidino methyl-3-phthalimido pyrrolidinedione-2,5 (3-phthalimido-N-(piperidino methyl) succinic acid imide) is obtained, M.P. 151–152° C.

EXAMPLE 5

12 g. of 3-phthalimido pyrrolidinedione-2,5 (3-phthalimido succinic acid imide) are suspended in 300 ml. of ethanol and refluxed. 5.2 ml. of an aqueous 35% formaldehyde solution are added dropwise thereto followed by the addition of 8.7 ml. of a solution of dimethylamine in water, containing 33% of dimethylamine. After one hour the solvent is distilled off under reduced pressure. The residue is dissolved in absolute ethanol. On adding di-isopropylether until the solution becomes turbid, 1-dimethyl amino methyl-3-phthalimido pyrrolidinedione-2,5 (3-phthalimido-N-(dimethylamine methyl) succinic acid imide) is obtained, M.P. 152–154° C.

EXAMPLE 6

12 g. of 3-phthalimido pyrrolidinedione-2,5 (3-phthalimido succinic acid imide) are suspended in 100 ml. of ethanol. 5 g. of N-methyl piperazine in 50 ml. of ethanol are mixed with 5.2 ml. of an aqueous 35% formaldehyde solution and the mixture is heated under reflux for 10 minutes. Thereby a solution of N-hydroxy methyl-N'-methyl piperazine is obtained. Said solution of N-hydroxy methyl-N'-methyl piperazine is added dropwise to the above mentioned suspension. After heating the reaction mixture under reflux for 10 minutes, the solvent is distilled off under reduced pressure. The residue is dissolved in toluene. On adding petroleum ether 1-(N-methyl) piperazino methyl-3-phthalimido pyrrolidinedione (3-phthalimido-N-[N'-methyl)-piperazino methyl ] succinic acid imide) is obtained, M.P. 151–153° C.

EXAMPLE 7

5 g. of 3-phthalimido pyrrolidinedione-2,5 (3-phthalimido succinic acid imide) are suspended in 30 ml. of ethanol. While heating, 5 ml. of an aqueous 35% formaldehyde solution are added dropwise thereto followed by the addition of 3 g. of β-napththylamine dissolved in 30 ml. of ethanol. After a few minutes 1-β-naphthylamino methyl-3-phthalimido pyrrolidinedione-2,5 (3-phthalimido-N- (β-naphthylamino methyl) succinic acid imide) precipitates; M.P. 209–210° C. on recrystallization from dioxane/ethanol.

EXAMPLE 8

On following the procedure as described in Example 7, 1 - α - naphthylamino methyl - 3 - phthalimido pyrrolidinedione-2,5 (3 - phthalimido-N-(α-naphthylamino methyl) succinic acid imide), M.P. 174° C. is prepared from 5 g. of 3-phthalimido pyrrolidinedione-2,5 and 3 g. of α-naphthylamine.

EXAMPLE 9

60 g. of 3-phthalimido pyrrolidinedione-2,5 (3-phthalimido succinic acid imide) are suspended in 750 ml. of ethanol. While heating, 30 ml. of an aqueous 35% formaldehyde solution are added dropwise thereto followed by the addition of 20 ml. of aniline dissolved in 30 ml. of ethanol. The reaction mixture is refluxed for one hour. On cooling, 1-anilino methyl-3-phthalimido pyrrolidinedione-2,5 (3-phthalimido-N-(anilino methyl) succinic acid imide) is obtained, M.P. 216–218° C.

EXAMPLE 10

5 g. of 3-phthalimido pyrrolidinedione-2,5 (3-phthalimido succinic acid imide) are suspended in 30 ml. of ethanol. 5 ml. of an aqueous 35% formaldehyde solution are added dropwise thereto followed by the addition of 2 g. of N-carbethoxy piperazine dissolved in 50 ml. of ethanol. After standing for 12 hours, 100 ml. of ethanol are added. 1-(N-carb-ethoxy piperazino methyl) - 3 - phthalimido pyrrolidinedione-2,5 (3-phthalimido-N-(N'-carbethoxy piperazino methyl) succinic acid imide) precipitates in white crystals, M.P. 140° C.

EXAMPLE 11

5 g. of 3-phthalimido pyrrolidinedione-2,5 (3-phthalimido succinic acid imide) are suspended in 30 ml. of ethanol. While heating, a mixture of 5 ml. of an aqueous 30% formaldehyde solution and 4 g. of 3,3-dimethyl-6-phenyl morpholine in 30 ml. of ethanol are added dropwise thereto. The reaction mixture is refluxed for 10 minutes. On cooling 1-(3',3'-dimethyl-6'-phenyl)-morpholino methyl-3-phthalimido pyrrolidinedione-2,5 (3-phthalimido-N-(3,3-dimethyl-6-phenyl morpholino methyl) succinic acid imide) precipitates in white crystals, M.P. 152–154° C.

EXAMPLE 12

On following the procedure as described in Example 11, 1-pyrrolidino methyl-3-phthalimido pyrrolidinedione-2,5 (3-phthalimido-N-(pyrrolidino methyl) succinic acid imide), M.P. 126–128° C. is obtained from 5 g. of 3-phthalimido pyrrolidinedione-2,5 and a mixture of 5 ml. of an aqueous 25% formaldehyde solution and 3 g. of pyrrolidine.

EXAMPLE 13

3 g. of 3-phthalimido pyrrolidinedione-2,5 (3-phthalimido succinic acid imide) are suspended in a mixture of 7.5 ml. of ethanol and 2.5 ml. of an aqueous 35% formaldehyde solution. The suspension is added to 1.5 g. of β,β'-dichloro diethylamine while stirring. The reaction mixture becomes clear and after a few minutes 1-(β,β'-dichloro diethylamino methyl)-3-phthalimido pyrrolidinedione-2,5 (3-phthalimido-N-(β,β'-dichloro diethylamino methyl) succinic acid imide) precipitates in white crystals, M.P. 139–141° C.

EXAMPLE 14

On following the procedure as described in Example 1 but using, as the one reactant, 3-(3',6'-dichloro phthalimido) glutaric acid imide (3-(3',6'-dichloro phthalimido) piperidinedione-2,6), M.P. 285–286° C., there is obtained 3-(3',6'-dichloro phthalimido)-N-(morpholino methyl) glutaric acid imide (1-morpholino methyl-3-(3',6'-dichloro phthalimido) piperidinedione-2,6, M.P. 205–208° C.

EXAMPLE 15

On following the procedure as described in Example 1 but using, as the one reactant 3-(4',5'-dichloro phthalimido) glutaric acid imide (3-(4',5'-dichloro phthalimido) piperidinedione-2,6) M.P. 282–284° C., there is obtained 3-(4'5'-dichloro phthalimido)-N-(morpholino methyl) glutaric acid imide (1-morpholino methyl-3-(4',5'-dichloro phthalimido) piperidinedione-2,6), M.P. 204–206° C.

EXAMPLE 16

On following the procedure as described in Example 1 but using, as the one reactant, 3-(3'-nitro phthalimido) glutaric acid imide (3-(3'-nitro phthalimido) piperidinedione-2,6), there is obtained 3-(3'-nitro phthalimido)-N-(morpholino methyl) glutaric acid imide (1-morpholino methyl-3-(3'-nitro phthalimido) piperidinedione - 2,6), M.P. 189–191° C.

EXAMPLE 17

150 g. of 3-phthalimido glutaric acid imide (3-phthalimido piperidinedione-2,6) are refluxed with 500 ml. of dioxane. 125 g. of N-methylol piperidine dissolved in 100 ml. of dioxane are added dropwise thereto while stirring vigorously. The reaction mixture is filtered, if necessary. The solvent is distilled off under reduced pressure from the resulting clear solution. The residue is dissolved in toluene. On adding petroleum ether, 3-phthalimido-N-(piperidinedione methyl) glutaric acid imide (1-piperidino methyl-3-phthalimido piperidinedione-2,6), M.P. 151–152° C., is obtained.

EXAMPLE 18

On following the procedure as described in Example 17, 3-phthalimido-N-(pyrrolidino methyl) glutaric acid imide (1-pyrrolidino methyl-3-phthalimido piperidinedione-2,6), M.P. 162–166° C., is obtained from 150 g. of 3-phthalimido glutaric acid imide (3-phthalimido piperidinedione-2,6) and 110 g. of N-methylol pyrrolidine.

EXAMPLE 19

On the following procedure as described in Example 17, 3-phthalimido-N-(N'-methyl piperazino methyl) glutaric acid imide (1-(N-methyl piperazino methyl)-3-phthalimido piperidinedione-2,6), M.P. 151–155° C., is obtained from 3-phthalimido glutaric acid imide (3-phthalimido piperidinedione-2,6) and N-methyl-N'-methylol piperazine.

EXAMPLE 20

258 g. of 3-phthalimido glutaric acid imide (3-phthalimido piperidinedione-2,6) and 30 g. of paraformaldehyde are suspended in 1000 ml. of dioxane and refluxed. 87.12 g. of morpholine are added dropwise thereto while stirring vigorously. If necessary, the reaction mixture is filtered. The resulting clear solution yields 3-phthalimido-N-(morpholino methyl) glutaric acid imide (1-morpholino methyl-3-phthalimido piperidinedione-2,6) in white crystals, M.P. 190–191° C. The compound is identical with that of Example 1. Yield 222 g. corresponding to 62% of the theoretical yield.

EXAMPLE 21

10.3 g. of 3-phthalimido-4-methyl pyrrolidine-dione-2,5 are suspended in 150 ml. of absolute ethanol and refluxed. While stirring, 3.5 g. of a solution of formaldehyde in water, containing 35% of formaldehyde are added dropwise thereto, followed by the addition of 3.5 g. of morpholine. The reaction mixture is refluxed for 15 minutes and is filtered, if necessary. The resulting clear solution yields 7.2 g. of 1-morpholino methyl-3-phthalimido-4-methyl pyrrolidinedione-2,5 on cooling, M.P. 176–177° C.

The starting material 3-phthalimido-4-methyl pyrrolidinedione-2,5 used in the preceding examples is obtained as follows:

44.1 g. of α-amino-α-methyl-succinic acid and 44.4 g. of phthalic acid anhydride are suspended in 300 ml. of absolute pyridine and refluxed for 5 hours. The solvent is distilled off under reduced pressure. The residue is dissolved in 300 ml. of acetic anhydride and refluxed for 10 minutes. After cooling α-phthalimido-α'-methyl succinic acid anhydride, M.P. 191–193° C. is obtained.

25.9 g. of α-phthalimido-α'-methyl succinic acid anhydride are mixed with 6 g. of urea. The reaction mixture is heated to 170–180° C. while stirring. After cooling 3-phthalimido-4-methyl pyrrolidine-dione-2,5, M.P. 224–228° C. is obtained on recrystallization from absolute ethanol.

EXAMPLE 22

100 g. of 3-(3',6'-dithia-3',4',5',6'-tetrahydrophthalimido) piperidinedione-2,6 are suspended in 2000 ml. of dioxane and the mixture is heated to 100° C. While stirring vigorously, 300 ml. of a solution of formaldehyde in water containing 40% of formaldehyde, are added dropwise thereto followed by the addition of 100 ml. of morpholine. The reaction mixture is filtered, if necessary. The solvent is distilled off under reduced pressure from the resulting clear solution while adding ethylene glycol mono-ethyl ether thereto at the same time. 1-morpholino methyl-3-(3',6'-dithia-3',4',5',6' - tetrahydrophthalimido) piperidinedione-2,6-precipitates in yellow crystals, M.P. 201–203° C. Yield: 100 g. corresponding to 75% of the theoretical yield.

EXAMPLE 23

298 g. of 3-(3',6'-dithia-3', 4', 5', 6'-tetrahydrophthalimido) piperidinedione-2,6 and 30 g. of paraformaldehyde are suspended in 1000 ml. of dioxane and reflux. While stirring vigorously, 85.2 g. of piperidine are added dropwise thereto. Stirring and heating is continued until a clear solution is obtained. On cooling, 1-piperidino methyl-3-(3'(6'-dithia-3',4',5',6'-tetrahydrophthalimido) piperidinedione-2,6 precipitates in yellow crystals, M.P. 207–208° C. Yield 356 g. corresponding to 90% of the theoretical yield.

EXAMPLE 24

Following the procedure as described in example 23, 1-pyrrolidino methyl-3-(3',6'-dithia-3',4',5',6'-tetrahydrophthalimido) piperidinedione-2,6 is obtained in yellow crystals, M.P. 190° C., by using 71.12 g. of pyrrolidine instead of 85.2 g. of piperidine.

The hereinabove mentioned starting material, the 3-(3',6,-dithia-3',4',5',6'-tetrahydrophthalimido) piperidinedione-2,6 is obtained in the following manner:

6 g. of 3,6-dithia-3,4,5,6-tetrahydrophthalic acid anhydride and 4.7 g. of glutamic acid are suspended in 100 ml. of dry pyridine and refluxed for 6 hours. The reaction mixture is filtered, if necessary. The solvent is distilled off under reduced pressure from the resulting clear solution. The residue is refluxed with 100 ml. of acetic acid anhydride for 10 minutes. On cooling and, if necessary, after distilling off part of the solvent, α-3,6-dithia-3,4,5,6- tetrahydrophthalyl) glutamic acid anhydride precipitates in yellow crystals, M.P. 243–246° C. Yield 93% of the theoretical yield.

15 g. of said compound are mixed with 1.5 g. of urea and heated to 250° C. for 15 minutes. 3-(3',6'-dithia-3',4',-5',6'-tetrahydrophthalimido) piperidinedione-2,6 is obtained in yellow crystals, M.P. 266–268° C. on recrystallization from ethylene glycol mono-ethyl ether. Yield: 70% of the theoretical yield.

EXAMPLE 25

5. g. of 3-succinimido piperidinedione-2,6 are refluxed with 30 ml. of ethylene glycol mono-ethyl ether. While stirring vigorously, 15 ml. of a solution of formaldehyde in water containing 30% of formaldehyde are added dropwise thereto, followed by the addition of 6 ml. of morpholine. On adding ether, 1-morpholino methyl-3-succinimido piperidinedione-2,6 precipitates from the clear solution which may have been clarified by filtration, if necessary. M.P. 185–188° C. (with decomposition) after recrystallization from dioxane/ether.

EXAMPLE 26

100 g. of 3 - (endo - cis - 3',6' - endocyclopropylene-Δ⁴' - tetrahydro phthalimido) piperidinedione - 2,6 are suspended in 500 ml. of dioxane and heated to 100° C. While stirring vigorously, 100 ml. of dry N-methylol morpholine are added dropwise thereto. Part of the solvent of the clear solution which has been filtered, if necessary, is distilled off under reduced pressure. On adding ether, 1-morpholino methyl - 3 - (endo - cis - 3',6'- endocyclopropylene - Δ⁴' - tetrahydrophthalimido) piperidinedione - 2,6 precipitates. M.P. 149–150° C.; yield: 75% of the theoretical yield.

The starting material 3 - (endo - cis - 3',6' - endocyclopropylene - Δ⁴' - tetrahydrophthalimido) piperidinedione-2,6 is obtained in the following manner:

190 g. of endo - cis - 3,6 - endocyclopropylene - Δ⁴-tetrahydrophthalic acid anhydride and 147 g. of glutamic acid are refluxed with 2,000 ml. of dry pyridine until a clear solution is obtained. The solvent is distilled off under reduced pressure. The residue is refluxed with 2,000 ml. of acetic anhydride for a short period of time. On cooling and, if necessary, distilling off part of the solvent, α - (endo - cis - 3,6 - endocyclopropylene-Δ⁴-tetrahydrophthalyl) glutamic acid anhydride precipitates in white crystals, M.P. 227° C.; yield: 93% of the theoretical yield.

301 g. of said compound are mixed with 30, 1 g. of urea. While stirring, the mixture is heated to 250° C. for 15 minutes. After recrystallization from ethylene glycol mono-ethyl ether, 3 - (endo - cis - 3',6' - endocyclopropylene - Δ⁴' - tetrahydrophthalimido) piperidinedione - 2,6 is obtained in white crystals, M.P. 285° C.; yield: 90% of the theoretical yield.

EXAMPLE 27

386 g. of 3 - [3',4' - (9'',10'' - dihydroanthrylene-9'',10'') succinimido]piperidinedione - 2,6 and 30 g. of paraformaldehyde are suspended in 1,000 ml. of dioxane and refluxed. 87 g. of morpholine are added dropwise thereto and refluxing is continued until a clear solution is obtained. On cooling, 1-morpholino methyl - 3 - [3',4'-(9'',10'' - dihydroanthrylene - 9'',10'') succinimido]piperidinedione-2,6 precipitates in white crystals, M.P. 80° C. with decomposition. Yield: 195 g. corresponding to 40% of the theoretical yield.

EXAMPLE 28

5 g. of 3 - naphthal - (1',8') - imido piperidinedione-2,6 are suspended in 50 ml. of dioxane. While heating, 8 g. of N-methylol morpholine dissolved in 20 ml. of dioxane are added dropwise thereto. On cooling, 1 - morpholino methyl - 3 - naphthal - (1',8') - imido piperidinedione-2,6, M.P. 226–228° C., precipitates in white crystals.

EXAMPLE 29

Following the procedure as described in Example 28, 1 - piperidino methyl - 3 - naphthal - (1',8') - imido piperidinedione - 2,6, M.P. 212–214° C., is obtained by using 10 g. of N-methylol piperidine, in place of N-methylol morpholine.

EXAMPLE 30

Following the procedure as described in Example 28, 1 - pyrrolidino methyl - 3 - naphthal - (1',8') - imido piperidinedione-2,6, M.P. 160–165° C., is obtained by using 10 g. of N-methylol pyrrolidine, in place of N-methylol morpholine.

The starting material 3 - naphthal - (1',8') - imido piperidinedione-2,6, M.P. 345–350° C., is obtained by proceeding as described for the other starting compounds, but using naphthalene-(1,8)-dicarboxylic acid anhydride and glutamic acid as reactants.

EXAMPLE 31

5 g. of 3-diethylacetamido piperidinedione-2,6, M.P. 192–194° C., are dissolved in 50 ml. of dioxane. While heating, 10 g. of N-methylol morpholine in 20 ml. of dioxane are added dropwise thereto. After one hour the solvent is distilled off under reduced pressure. The residue is dissolved in toluene. On adding petroleum ether, 1-morpholino methyl - 3 - diethylacetamido piperidinedione-2,6 precipitates in white crystals, M.P. 124–127° C. Yield: 80% of the theoretical yield.

EXAMPLE 32

Following the procedure as described in Example 31, 1 - piperidino methyl - 3 - diethylacetamido piperidinedione-2,6 is obtained in white crystals by using N-methylol piperidine in place of N-methylol morpholine. M.P. 80–84° C. on recrystallization from ligroin. Yield: 71% of the theoretical yield.

EXAMPLE 33

5 g. of 3-benzamido piperidinedione - 2,6, M.P. 219–221° C., are dissolved in 50 ml. of dioxane. While heating, 10 g. of N-methylol morpholine dissolved in 20 ml. of dioxane are added dropwise thereto. After one hour the solvent is distilled off under reduced pressure. The residue is dissolved in dioxane. On adding ether, 1-morpholino methyl - 3 - benzamido piperidinedione - 2,6 precipitates in white crystals, M.P. 174–175° C.

EXAMPLE 34

Following the procedure as described in Example 33, 1 - piperidino methyl - 3 - benzamido piperidinedione-2,6 is obtained by using N-methylol piperidine, in place of N-methylol morpholine. M.P. 168–171° C.

EXAMPLE 35

5 g. of 3 - (N - acetyl - ureido) piperidinedione - 2,6, M.P. 232–233° C. are dissolved in 50 ml. of dioxane and refluxed. 10 g. of N-methylol morpholine dissolved in 20 ml. of dioxane are added dropwise thereto. After one hour the solvent is distilled off under reduced pressure. The residue is dissolved in dioxane. On adding ether, 1 - morpholino methyl - 3 - (N' - acetyl ureido) piperidinedione-2,5 precipitates in white crystals, M.P. 167–168° C.

EXAMPLE 36

5.5 g. of 1-methylol-3-phthalimido-pyrrolidinedione-2,5 are dissolved in 90 ml. of ethanol. The reaction mixture is heated for one hour. From the—if necessary after filtration —clear solution the 1-(N-methyl-N-morpholino)-aminomethyl-3-phthalimido-pyrrolidinedione - 2,5, M.P. 139–142° C. is obtained by chilling. Yield 4.0 g. 54% of the theoretical one.

EXAMPLE 37

54.8 g. of 1-methylol-3-phthalimido-pyrrolidinedione-2,5 are suspended with 400 ml. of absolute ethanol and refluxed. 27.4 g. of N-methylamino-piperidine are added dropwise. The reaction mixture is refluxed for 30 minutes. Most of the solvent of the—if necessary after filtration—clear solution is distilled off under reduced pressure. By chilling the 1-(N-methyl-N-piperidino)-aminomethyl-3-phthalimido-pyrrolidinedione-2,5 is obtained in white crystals, M.P. 121–128° C. Yield 58 g., 78% of the theoretical one.

EXAMPLE 38

68.5 g. of 1-methylol-3-phthalimido-pyrrolidinedione-2,5 are suspended with 500 ml. of absolute ethanol and refluxed. 27.5 g. N-methylamino-pyrrolidine are added dropwise. The reaction mixture is refluxed for 20 minutes. Most of the solvent of the—if necessary after filtration—clear solution is distilled off under reduced pressure. By chilling the 1-(N-methyl-N-pyrrolidino)-aminomethyl-3-phthalimido-pyrrolidinedione-2,5 is obtained in white crystals, M.P. 123–131° C. Yield 65 g., 73% of the theoretical one.

EXAMPLE 39

Following the procedure of Example 38, the 1-(N-methyl - N - dimethyl - amino) - aminomethyl - 3 - phthalimido-pyrrolidinedione-2,5 is obtained from 27.4 g. of 1-methylol-3-phthalimido-pyrrolidinedione-2.5 and 8.5 g. 49% of the theoretical one.

EXAMPLE 40

5.2 g. of 3 - phthalimido - piperidinedione - 2,6 are suspended with 40 ml. of ethyleneglycolmonoethylether and heated at 100° C. 10 ml. of a solution of formaldehyde in water, containing 30% of formaldehyde are added dropwise, followed by 6.6 g. of N-methylamino-morpholine. The solvent of the—if necessary after filtration—clear solution is distilled off under reduced pressure. The residue is dissolved in dioxane. Adding ether the 1 - (N-methyl - N - morpholino)aminomethyl - 3-phthalimido-piperidinedione - 2,6, M.P. 136–143° C., is obtained.

EXAMPLE 41

Following the procedure of Example 40 the 1 - (N-methyl - N - piperidino) - aminomethyl-3-phthalimido-piperidine - dione - 2,6, M.P. 124–129° C. u. dec. is obtained from 33 - phthalimido - piperidinedione - 2,6 and N-methylamino-piperidine.

In place of the cyclic imides used in the preceding examples as the one reactant, there may be employed other cyclic imides as mentioned hereinabove and, in addition thereto, cyclic imides in which X is

whereby $R_7$ is a substituted or unsubstituted heterocyclic group such as the hydantoin, thiazolidine - 2,4 - dione, 1,3-thiazine - 2,4 - dione, 2,4 - dioxo pyrimidine, or similar heterocyclic groups. The dicarboxylic acid imides attached to the cyclic imide when X is

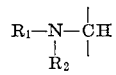

may, of course, be substituted, for instance, by halogen, the nitro group, amino groups, lower alkoxy-phenyloxy, naphthyloxy, benzyloxy, phenyl ethoxy, lower alkyl, and other substituents.

Likewise, in place of morpholine, piperidine, and pyrrolidine, used in the preceding examples as the other reactant, there may be employed primary and secondary amino compounds, such as lower alkylamines, like dimethylamine, $\beta,\beta$-dichloro diethylamine and others, lower alkanolamines, aniline, toluidines, benzylamine, phenyl ethylamine, halogen or lower alkyl substituted anilines, naphthylamines, or thiomorpholine and other five- or six-membered heterocyclic compounds with a reactive hydrogen atom attached to a ring-nitrogen atom, or C-substituted heterocyclic compounds such as the lower alkyl substituted morpholines, piperidines, pyrrolidines, piperazines, or N-methyl or other N-lower alkyl, N-benzyl, N-(β-hydroxy ethyl), N-carbethoxy, N-acetyl, or N-lower alkanoyl, piperazines, while otherwise the procedure is the same as described in said examples.

The acid addition salts of the compounds according to the present invention are obtained in a manner known per se by reaction with inorganic or organic acids As stated above, the new compounds have noteworthy effects upon tumors as they are induced in Sprague-Dawley rats, for instance, by 7,12-dimethyl benz(a)-anthracene. Such tumors respond to prophylactic administration of the new compounds as well as to a therapeutic treatment therewith. Under prophylactic administration they delay the appearance and growth of 7,12 - dimethyl benz-anthracene-induced tumors. Apparently the mechanism of the antitumor-activity of the new compounds differ from that of known cytostatic agents.

Preferably, the new imide compounds according to the present invention or their pharmaceutically acceptable acid addition salts are administered perorally in a pharmaceutical carrier in standard form as tablets, pills, lozenges, dragees and the like shaped and/or compressed preparations. It is also possible to produce emulsions or suspensions of said compounds in water or aqueou media such as unsweetened fruit juices and by means of suitable emulsifying or dispersing agents. The new antitumor agents may furthermore be employed in the form of powders filled into gelatin capsules or the like.

Such powders and mixtures to be used in the preparation of tablets and other shaped and/or compressed preparations may be diluted by mixing and milling with a solid pulverulent extending agent to the desired degree or fineness or by impregnating the already milled, finely powdered, solid carrier with a suspension of the new imide compounds in water or with a solution thereof in an organic solvent and then removing the water or solvent.

When preparing tablets, pills, dragees, and the like shaped and/or compressed preparations, the commonly used diluting, binding, and disintegrating agents, lubricants, and other tableting adjuvants are employed, provided they are compatible with the new imide compounds. Such diluting agents and other excipients are, for instance, sugar, lactose, levulose, starch, bolus alba, as disintegrating and binding agents gelatin, gum arabic, yeast extract, agar, tragacanth, methyl cellulose, pectin, and as lubricants stearic acid, talc, magnesium stearate, and others.

It is, of course, also possible to administer the new imide compounds in the form of suppositories, whereby the commonly used suppository vehicles, such as cacoa butter are used.

The new compounds may also be administered parenterally whereby aqueous solutions of water-soluble compounds or suspensions may be used.

As stated above a number of the compounds of Formula I have also a considerable blood pressure lowering effect which persists for a prolonged period of time.

They also exhibit immuno-suppressive properties as proved by their favorable effect on the survival of transplanted tissue, i.e., living particles of tissue transplanted from one organism to another. Their immuno-suppressive properties may explain the fact that treatment with compounds of Formula I favorably affects leprosy as well as damages caused by X-rays and auto-immune diseases.

Administration of compounds of Formula I has also a marked effect on the endocrine system and thus permits their use in the treatment of endocrinopathies.

Furthermore, many compounds of Formula I have a pronounced sedative effect and can be used therapeutically for said purpose.

What is claimed is:
1. A dicarboxylic acid imide of the formula wherein

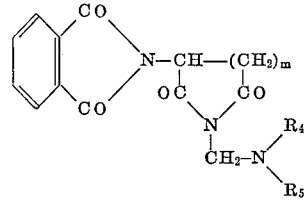

$m$ is 1 or 2, $R_4$ and $R_5$ taken together with the nitrogen atom form piperidino, morpholino or pyrrolidino, or $R_4$ is lower alkyl of 1 to 4 carbon atoms and $R_5$ is piperidino, morpholino or pyrrolidino or the pharmaceutically acceptable acid addition salts of said imide.

2. 1 - morpholino methyl - 3 - phthalimido piperdine-dione-2,6.

3. 1 - morpholino methyl - 3 - phthalimido pyrrolidine-dione-2,5.

4. 1 - piperidino methyl - 3 - phthalimido piperidine-dione-2,6.

5. 1 - pyrrolidino methyl - 3 - phthalimido piperidine-dione-2,6.

6. 1 - morpholino methyl - 3 - (3',6'-dithia-3',4',5',6'-tetrahydrophthalimido) piperidinedione-2,6.

7. 1 - piperidino methyl - 3 - (3',6'-dithia-3',4',5',6'-tetrahydrophthalimido) piperidinedione-2,6.

References Cited

Chemical Abstracts, vol. 55, p.25, 993d (1961).

ALEX MAZEL, Primary Examiner

J. TOVAR, Assistant Examiner

U.S. Cl. X.R.

260—247.2, 294, 326; 424—248, 274, 267